United States Patent [19]

Schmidt

[11] Patent Number: 4,765,753
[45] Date of Patent: Aug. 23, 1988

[54] METHOD AND APPARATUS FOR HANDING-OVER A RADIO CONNECTION FROM ONE RADIO CELL TO ANOTHER RADIO CELL OF A DIGITAL RADIO TRANSMISSION SYSTEM

[75] Inventor: Werner Schmidt, Roscommon, Ireland

[73] Assignee: U.S. Philips Corporation, New York, N.Y.

[21] Appl. No.: 21,105

[22] Filed: Mar. 3, 1987

[30] Foreign Application Priority Data

Mar. 8, 1986 [DE] Fed. Rep. of Germany ....... 3607687

[51] Int. Cl.$^4$ .............................................. H04Q 7/01
[52] U.S. Cl. ......................................... 379/60; 455/33; 370/18
[58] Field of Search ...................... 455/33; 379/59, 60; 370/18

[56] References Cited

U.S. PATENT DOCUMENTS

| | | | |
|---|---|---|---|
| 4,472,815 | 9/1984 | Gutleber | 375/34 |
| 4,475,186 | 10/1984 | Gutleber | 370/18 |
| 4,475,214 | 10/1984 | Gutleber | 375/34 |
| 4,514,853 | 4/1985 | Gutleber | 375/34 |
| 4,528,656 | 7/1985 | Morais | 370/30 |
| 4,542,515 | 9/1985 | Gutleber | 375/17 |
| 4,670,906 | 6/1987 | Thro | 455/56 |
| 4,697,260 | 9/1987 | Gravel et al. | 370/18 |
| 4,723,266 | 2/1988 | Perry | 379/60 |

FOREIGN PATENT DOCUMENTS 2162404 1/1986 United Kingdom .................. 379/59

Primary Examiner—Robert Lev
Attorney, Agent, or Firm—Thomas A. Briody; Algy Tamoshunas; William J. Streeter

[57] ABSTRACT

Base radio stations are spatially arranged in a radio transmission system in accordance with a cellular system, separating the message transmission channels from adjacent base stations being effected either by using the frequency-division multiplex method or by using the code-division multiplex method or by using a combination of these multiplex methods. In appropriately large spatial distances the same set of channels can be repeated in a further radio cell. If a mobile radio station moves during the conversation from one radio cell into another, then it is necessary to hand-over the then existing radio connection. To avoid the necessity of using additional receivers in each base station and to prevent a repeated hand-over in the event of high co-channel interferences, the measurements used for hand-over decision are effected in the mobile radio station. As part of the method the reception quality of the co-channel message transmission channels of remote base stations are additionally measured in the mobile station during the existence of a radio connection to a near base station.

15 Claims, 2 Drawing Sheets

CELL STRUCTURE OF DIGITAL
RADIO TRANSMISSION SYSTEM

METHOD AND APPARATUS FOR HANDING-OVER A RADIO CONNECTION FROM ONE RADIO CELL TO ANOTHER RADIO CELL OF A DIGITAL RADIO TRANSMISSION SYSTEM

The invention relates to a method of handing-over a radio connection when a mobile radio station moves from one radio cell to another radio cell in a digital radio transmission system.

In the non-prepublished German Patent Application, file No. P 35 27 331.3 a digital radio transmission system is proposed in which in the forward and return directions of the message transmission channel a different modulation method is used in each direction. In the direction from the base radio station to the mobile radio stations associated therewith each message transmission channel is spread by bandspread modulation. The spread message transmission channels thus formed are superimposed on each other in the base radio station and the broadband sum signal obtained thereby is transmitted in a common frequency band. In the direction from the mobile radio stations to the stationary radio station the message transmission is effected in separate, narrow-band frequency channels.

For speech transmission, from the base station to the mobile stations, the bandspread modulation used is selected by the base station and communicated to the mobile station when building-up the communication link. For the transmission of synchronizing symbols to the mobile radio stations assigned to the base station, a bandspread modulation which is common to all the mobile radio stations is used in the direction from the base radio station to the mobile radio stations.

In digital radio transmission systems the base stations are spatially arranged in a cellular system. When frequencies are allocated in digital radio transmission systems, a plurality of radio cells is combined into one cell cluster, different sets of channels being used in the several cells of a cluster. In this situation it is alternatively possible to allocate within a radio cell several sets of channels to the base station. Spatially the distribution of channel sets in a cell cluster is periodically repeated. The size of the cell cluster determines a co-channel reuse distance, it being possible to choose for the network design (frequency allocation) the co-channel reuse distance and, consequently, the size of the cell cluster such that the requirements as regards the degree of freedom of interferences in the digital radio transmission system are satisfied.

A set of channels of a base station can, for example, consist of 32 message transmission channels. The individual message transmission channels for the several mobile radio stations are separated from each other in a set of channels by, for example, different spreadcode modulation words (CDMA) and/or different time slots (TDMA). The structure of a set of channels is obtained in that, for example, a plurality of time slots, each one containing the information for every one subscriber, are combined into a time-division multiplex frame, the time-division multiplex frame having, for example, four time slots. Immediately thereafter the information contained in such a time-division multiplex frame is spread with suitably chosen code words, which allow the simultaneous transmission of a plurality of time-division multiplex frames on the same carrier frequency. Spreading of these time-division multiplex frames is effected by means of one code word which, in this set of channels, is only assigned to this specific time-division multiplex frame. If, for example, eight different code words are used for each set of channels, then the set of channels comprises eight different time-division multiplex frames, each having four time channels, yielding a total of 32 message transmission channels per channel set.

Each set of channels has at least one control channel assigned to it, which is accessed by the mobile stations for establishing a link and via which the connection is set-up and some special services are performed. The mobile stations know the frequency position of the possible sets of channels, the corresponding time channel and the code words for the control channels provided within the digital radio transmission system. Having this knowledge, the mobile station can search for an appropriate control channel and can receive there all the information necessary for accessing (for example, the frequency of the narrow-band (return) direction from the mobile station to the base station of the control channel) and for setting-up the connection (for example time channel and code word for message transmission in the direction from the base station to the mobile station, and also the frequency for the transmission in narrow-band frequency channels in the direction from the mobile station to the base station).

Separating the message channels from adjacent base stations is effected either by using the frequency-division multiplex method (different RF-carriers for the set of channels used in these base stations) or by using the code-division multiplex method (different sets of code words for the sets of channels) or by using a combination of these multiplexing methods. The same channel set (RF-carrier and/or code word set) can be repeated in a further radio cell when spaced sufficiently apart (determined by co-channel interferences produced). If adjacent radio cells are separated from each other by different carrier frequencies and co-channel radio cells are separated from each other by different code words, then cell clusters having, for example, 3 to 4 radio cells in each cluster can be formed for the broadband transmission in the direction from the base station to the mobile stations. For a cell cluster having three radio cells of identical carrier frequencies it is obtained that when three different code sets are used, a frequency and code set repetition occurs in the cell structure every ninth radio cell. If four different code sets are used then the same frequency-code combination occurs only after every twelfth radio cell.

For a total overall band width of 25 MHz, available in, for example, the digital radio transmission system, 20 sets of channels (each having 32 message transmission channels) can be formed with a transmission-bandwidth of approximately 1.25 mHz. For the transmission direction from the mobile radio stations to the base station, the message transmission is effected in frequency channels the carrier frequencies of which are spaced 25 KHz apart. The frequency allocation in the radio cells themselves is not fixed, the frequencies are rather freely allocated by the base radio station. Because it is possible for a mobile radio station to travel during the conversation from one radio cell to another, it is necessary that the then existing radio connection is switched through from the previous radio cell to another one, a process that is commonly known as "hand-over". Also the occurrence of unexpectedly high co-channel interferences may render it necessary that within the radio cell a change to a message transmission channel with a higher transmission quality is to be made. Extensive research has proved that for the direction of transmission from the mobile radio station to the base station (narrow-band transmission) there are hand-over criteria for the radio connection on the basis of the field strength or jitter or the beat frequency. For the direction from the base station to the mobile stations (broadband transmission) criteria can be determined on the basis of the field strength and the multi-path profile properties.

DE AS No. 26 34 080 discloses a method of hand-over of a radio connection, in which additional receivers and radio receivers are provided in the base stations. The receive voltages of the radio receivers and the receive voltages of the additional receivers provided in adjacent base stations are compared to each other in a comparator in the base station of the radio traffic area. When in the radio receiver the receive voltage falls short of a preset threshold value, then a switch is effected with the aid of the control arrangement of the radio cell to that additional receiver for which the comparator has found the highest receiving voltage.

In the new radio base station an additional transmitter is switched to the speech channel used in the prior radio cell and a channel command for a speech channel which in the new base station is identified as being free is transmitted to the mobile radio station via said speech channel. After evaluation of the channel command in the mobile radio station it is switched to the new speech channel and the radio connection for the new radio cell is established again and switched through in the switching center connected thereto, which is effected by transmitting the identification of the mobile radio station to the base station.

The invention has for its object to provide a method of radio connection hand-over by the mobile radio station when the mobile station passes from one radio cell into another, that the hand-over is effected automatically and without interrupting the conversation and that the base station does not require a field strength measuring receiver for obtaining a hand-over criteria.

This object is accomplished using a method in accordance with the characterizing features of the Patent Claim 1.

By measuring the reception quality criteria in the mobile radio station it is possible for areas of varying building densities to prevent, when the mobile station moves only once from a radio cell into another, a conversation from being repeatedly hand-over, which occurs when only the field strength criterium is used. In addition, arrangements only present in the mobile station, more specifically for measuring the reception quality criteria, can be used advantageously. Having the switching center participate in the decision whether a conversation must be switched-through or not, is not required in the method according to the invention, so that the dynamic load on the switching center is reduced. Because of the fact that the mobile station measures the reception quality of the co-channel message transmission channels of remote base stations during the existence of a radio connection to a base station, no synthesizer change-over is required in the mobile station. The co-channel message transmission channels of the remote base stations differ from the near base station only in their code words. The receiver provided in the mobile radio station can consequently be additionally used to monitor the existing radio connection during the conversation. In the digital radio transmission system the base radio stations transmits in time-division multiplex frames synchronizing signals which are inserted between the data symbols at regular intervals, such as is proposed in, for example, the non-prepublished German Patent Application bearing the official file number P 35 11 430.4. The base radio station transmits the synchronizing symbols in all the message transmission channels in time-parallel and in synchronism. The identical synchronizing symbols transmitted simultaneously in all the message transmission channels are received in the mobile station with a significantly higher energy, compared to user informations. If the transmission field strength of the remote base stations are used as a basis for the hand-over criterion, the evaluation can be effected in a simple manner.

If in accordance with Patent Claim 2 the mobile radio station is informed of the spread-code words of the remote base radio stations by the near base radio station maintaining the connection, then the code-words can be altered during system gyration, if necessary, without necessitating modifications of the mobile stations' software.

In accordance with the method claimed in Patent Claim 4, the base radio station includes a store in which the measuring values transmitted by the mobile radio station are stored. These measuring values do not relate to message transmission channels of the base radio stations adjacent to the base radio station, as in the method described in De-AS No. 26 34 080, but to co-channel message transmission channels of remote base radio stations. By weighting the stored measuring values it is possible in the digital radio transmission system to effect an adaptation to the terrain also during operation. In a channel-assigning method described in DE-OS No. 29 37 108 it is determined, before the network is made operative, by means of measurements where co-channel interferences may occur. The propagation conditions in a radio transmission system constantly change during operation (for example by weather conditions), so that by combining the measuring values with the weighting factors an adaptation to the channel properties can be effected and the transmission reliability can be increased. As already described in the foregoing, the synchronizing symbols are transmitted simultaneously and consequently with a higher average power in all the message transmission channels. As a result thereof the synchronizing symbols are received substantially without interferences in the mobile radio station and can be used, in accordance with Patent Claim 5, for measuring the reception quality.

As already described in the foregoing, inserting the synchronizing symbols in the continuous data flow of user information is effected with predetermined time intervals, which are determined such that the multi-path reception can also be used at high vehicle speeds. By a phase-locked (not necessarily equal-phase) addition of the synchronizing symbols an (uncontrolled) relative cancelling of inherently identical synchronizing symbols in the individual message transmission channels is prevented. If in accordance with Patent Claim 5 the multi-path profile is used as the reception quality criterion, then the message transmission channels can be adapted in the receiving arrangements to the channel properties on the basis of the measured multi-path profile, and the transmission reliability can be further increased. The mobile radio station only requires, as an additional device, an additional store for storing the measuring values, and arrangements already present in the mobile radio station can also be used advantageously.

The method according to the invention will now be described and illustrated by way of example with reference to the embodiments shown in the accompanying drawings. Therein:

Figure 1:
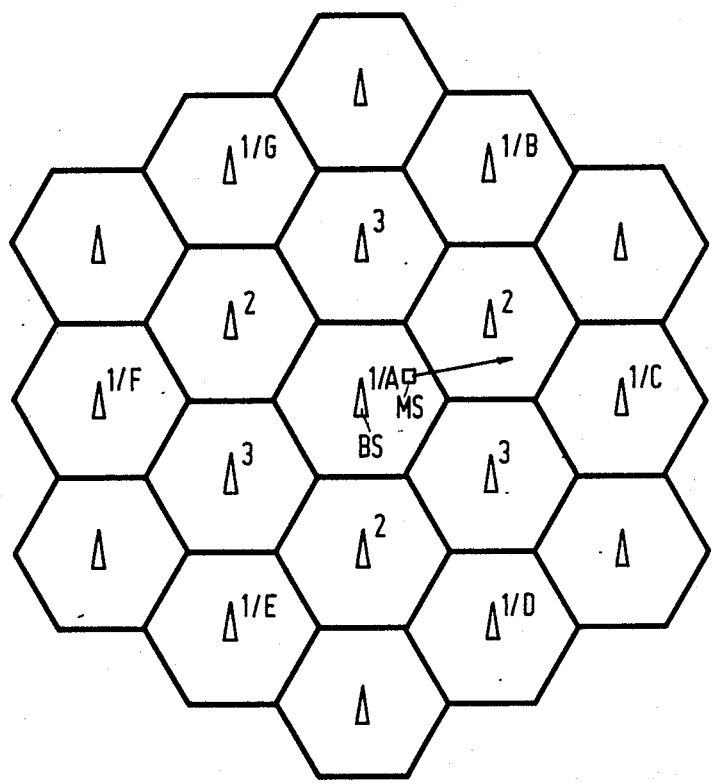
FIG. 1 shows the cell structure of the digital radio transmission system.

FIG. 1 shows an embodiment for a cell structure of the digital radio transmission system. Base radio stations BS are arranged in the centre of the various radio cells. The direction in which a mobile radio station MS moves is indicated in FIG. 1 by the arrow indicating the direction of travel.

In digital radio transmission systems sets of channels are formed, for example by a sequence of code-division multiplex and frequency-division multiplex operations performed on the message signals to be transmitted. Separating the message transmission channels of adjacent base radio stations BS is effected using the frequency-division multiplex method, that is to say different RF-carriers for the sets of channels used in these base stations, which is illustrated in FIG. 1 by the first digit. The radio cells can be combined into cell groups (clusters), different channel cells being used in the several radio sets of a cluster and the spatial distribution of the channel sets in a cluster being periodically repeated. During designing of the network, the co-channel reuse distance and consequently the size of the cell clusters can be chosen such that predetemined requirements for the freedom of interference in the network are satisfied. Co-channel radio cells are separated in the digital radio transmission system by means of different code words, which is illustrated in FIG. 1 by the capital letters A to G. For locating itself within the radio cell assignment and consequently the decision for hand-over, reception quality criteria measurements are effected in the mobile station. To that end, during the existence of a radio connection to the near base station 1/A (centrally in the network structure shown in FIG. 1) the reception quality of the co-channel message transmission channels of remote base stations BS are additionally measured in the mobile station MS. In the practical example of the network structure shown in FIG. 1 the mobile station MS measure the transmission field strength of the base stations BS denoted by 1/B, 1/C, 1/D, 1/E, 1/F and 1/G. The decision whether the radio connection must be handed-over is made in the near base station BS which maintains the connection. For that purpose the measuring results are transmitted to the near base station BS, which maintains the connection, in a low-rate signalling channel (ACCH). This is done in such a manner that it is inaudible for the subscriber, in parallel with the transmission of the digitized speech. A further possibility is to transmit the measuring results instead of the digitized speech during the speech pauses and to extract these measuring results in the base station before the reconversion of the speech.

The base station BS incorporates a store for storing the measuring values transmitted by the mobile station MS via the message transmission channel. This store contains predetermined threshold values for the reception quality of the co-channel message transmission channels from remote base stations and by comparing these values to the measuring values determined by the mobile station MS for these base stations, a decision can be taken in the base station BS 1/A about handing-over of the radio connection. This comparison is consequently based on a radio bearing, the radio bearing effected being reflected in the increase and decrease of the measuring results. It is possible, without modifying the method of the invention, to effect a plurality of measurements for each base station BS throughout a measuring period and to increase the decision reliability by taking the average value. To adapt the factors which influence the propagation condition, for example terrains, weather etc., the measuring values can be combined with weighting factors prior to storage.

Figure 2:
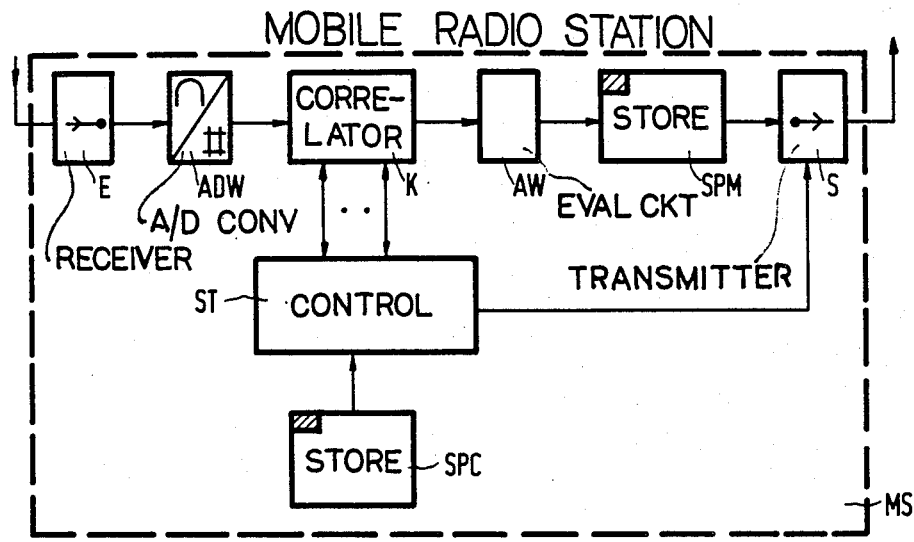
FIG. 2 shows the block circuit diagram of a first embodiment.

FIG. 2 shows the block circuit diagram of a first embodiment of the circuit arrangement provided in the mobile radio station MS when performing the method according to the invention. The signals received by the aerial are applied to a receiver E whose output is connected to an analogue-to-digital converter ADW. The receiver E has an RF-input stage, an oscillator as well as an IF-portion containing a preset amplifier. The signals converted to the baseband thereby are applied for further processing via the analogue-to-digital converter ADW to a correlator K connected thereto. The correlator K is connected to both a control device ST and to an evaluation circuit AW. With the aid of the evaluation circuit AW the measured reception quality of the co-channel massage transmission channels from the remote base stations BS are evaluated. The evaluated measuring values are stored in a first store SPM connected to the evaluation circuits AW and these measuring values are transmitted to the base station BS by means of a transmitter S via the message transmission channel. The control arrangement ST is connected to both the transmitter S and to a third store SPC in which the code words are stored. A store suitable for this purpose is, for example a read-only memory.

When the cost and design effort of the store in the mobile radio stations MS are to be reduced, then it is possible to omit also the first store SPM without altering the method of the invention, which creates the situation that then on the request of the base station BS the first measurement of the reception quality criteria is efected in the mobile station MS, this measuring value is transmitted to the base station BS via the message transmission channel, whereafter the second measurement is effected etc.

Figure 3:
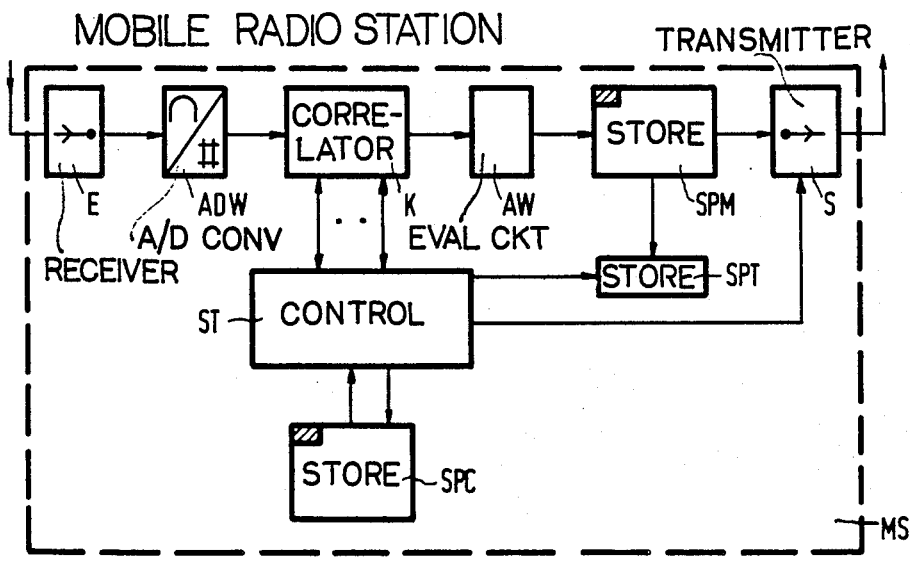
FIG. 3 shows the block circuit diagram of a second embodiment of the circuit arrangement used in the mobile radio station in the method according to the invention.

FIG. 3 shows the block circuit diagram of a second embodiment of a circuit arrangement used during the performance of the method according to the invention. A second store SPT which is connected to the first store SPM and to the control arrangement ST is arranged in the mobile radio station MS. The measuring values evaluated in the preceding measuring cycles by the evaluation circuit AW of the mobile radio station MS are stored in the second store SPT. It is also possible to store in this store SPT the receiving quality threshold values of the remote base stations BS which are transmitted by the base station BS to the mobile radio stations MS via the message transmission channel. On the basis of the evaluated measuring values stored in the second store SPT the control arrangement ST decides on handing-over the radio connection.

What is claimed is:

1. A method for deciding when to handing-over a radio connection when a mobile radio station (MS) moves from one radio cell into another radio cell in a digital radio transmission system with frequency-division multiplexing of adjacent radio cells and wherein co-channel radio cells are separated by different spread codes, comprising the steps of the reception quality criteria measurements to be effected in the mobile station (MS) for assigning itself one of the radio cells and consequently for the hand-over decision are effected such that additionally during the existence of a radio connection to a near base station (BS) the reception quality of the co-channel message transmission channels are measured in the mobile radio station (MS).

2. A method as claimed in claim 1, characterized in that the spread codes used by remote base stations (BS) for co-channel message transmission channels are transmitted via the message transmission channel by the near base station (BS) maintaining the connection, to the mobile station (MS).

3. A method as claimed in claim 1, characterized in that the results of the measurements of the reception quality of the co-channel message transmission channels effected in the mobile station (MS) are transmitted by the mobile station (MS) via the message transmission channel to the near base station (BS) maintaining the connection.

4. A method as claimed in claim 3, characterized in that the near base station (BS) maintaining the connection stores the received results and on the basis of the results stored in the store takes the decision if and to which of the adjacent base station (BS) hand-over of the radio connection is to be effected.

5. A method as claimed in claim 1, characterized in that the spread codes used for the co-channel message transmission channels of the remote base stations (BS) for the purposes of synchronization and multi-path resolution differ from each other and are also used in the mobile radio station (MS) for measuring the reception quality.

6. A method as claimed in claim 5, characterized in that a signal characterizing the multi-path profile at the output of a correlator (K) which is included in the mobile station (MS) and is adjusted to the spread code to be evaluated by means of a control arrangement (ST) and on the basis of a spread code stored in a store (SPC), is used as the reception criterion.

7. A circuit arrangement for performing the method as claimed in claim 1, characterized in that the mobile radio station (MS) includes a control arrangement (ST) connected to a correlator (K), that the output of the correlator (K) is connected to an evaluation circuit (AW) for evaluating the measured reception quality of the co-channel message transmission channels of remote base stations (BS) and that the evaluated measuring values are stored in a first store (SPM) connected to the evaluation circuit (AW).

8. A circuit arrangement as claimed in claim 7, characterized in that the mobile station (MS) incorporates a second store (ST) which is connected to the first store (SPM) and to the control arrangement (ST) and in which predetermined threshold values transmitted by the remote station (BS) via the message transmission channel to the mobile station (MS) for the reception quality of other base stations (BS) and/or in which measuring values evaluated in previous measuring cycles by the evaluation circuit (AW) of the mobile station (MS) are stored and that on the basis of the evaluated measuring values stored in the second store (SPT) the control arrangement (ST) decides on hand-over of the radio connection and conveys this decision via a message transmission channel to the near base station (BS) maintaining the connection.

9. In a radio transmission system comprising multiple radio cells, adjacent cells being frequency multiplexed and at least some non-adjacent radio cells being co-channel, said co-channel radio cells being separated by different spread codes, the method for handing-over a radio connection via a first message transmission channel between a mobile radio station and a first base station in a first cell to a radio connection via a second message transmission channel between said mobile radio station and a second base station in an adjacent radio cell comprising the steps of:

during the existence of a radio connection between said mobile radio station and said first base station, receiving in said mobile radio station at least one co-channel message transmission channel from at least one base station in at least one non-adjacent radio cell;

measuring in said mobile radio station the reception quality of said at least one received co-channel message transmission channel;

using the measured reception quality of said at least one-channel message transmission channel to decide whether to hand-over said radio connection via said first message transmission channel between said mobile radio station and said first base station to a radio connection via a second message transmission channel between said mobile radio station and a second base station in an adjacent radio cell.

10. The method of claim 9 wherein said last recited step is carried out in said mobile radio station.

11. The method of claim 9 further comprising the step of transmitting from said first base station to said mobile radio station via said first message transmission channel the spread codes used for co-channel message transmission channels by base stations in non-adjacent radio cells.

12. The method of claim 9 further comprising the step of transmitting from said mobile radio station to said first base station via said first message transmission channel the measured reception quality of said at least one co-channel message transmission channel.

13. The method of claim 12 further comprising the step of receiving and storing in said first base station the measured reception quality of at least one co-channel message transmission channel measured in said mobile radio station, the decision whether to hand-over said radio connection via said first message transmission channel between said mobile radio station and said first base station to a radio connection via a second message transmission channel between said mobile radio station and a second base station in an adjacent radio cell being made in said first base station.

14. The method of claim 9 wherein said base stations use spread codes for the purposes of synchronization and multi-path resolution and wherein said spread codes used for co-channel message transmission channels by base stations in non-adjacent radio cells for the purposes of synchronization and multi-path resolution differ from each other and are used in said mobile radio station to identify the base station transmitting the co-channel message transmission channel while measuring the reception quality of the same.

15. Mobile radio station apparatus for use in a radio transmission system comprising multiple radio cells, adjacent cells being frequency multiplexed and at least some non-adjacent radio cells being co-channel, said co-channel radio cells being separated by different spread codes, a receiver for receiving message transmission channels from said first and second base stations and from base stations in radio cells non-adjacent to said first cell, said receiver without changing frequencies receiving a message transmission channel from said first base station and also receiving co-channel message transmission channels from base stations in radio cells non-adjacent to said first cell, measuring means for measuring the reception quality of at least one received co-channel message transmission channel, evaluation means for evaluating the measured reception quality of said at least one co-channel message transmission channel and deciding whether to hand-over a radio connection established via a first message transmission channel between said mobile radio station and a first base station to a radio connection via a second message transmission channel between said mobile radio station and a second base station.

* * * * *

UNITED STATES PATENT AND TRADEMARK OFFICE
CERTIFICATE OF CORRECTION

PATENT NO. : 4,765,753

DATED : August 23, 1988

INVENTOR(S) : Werner Schmidt

It is certified that error appears in the above-identified patent and that said Letters Patent is hereby corrected as shown below:

Claim 8, line 3, change "(ST)" to -- (SPT) --.

Signed and Sealed this

Ninth Day of May, 1989

Attest:

DONALD J. QUIGG

*Attesting Officer*  *Commissioner of Patents and Trademarks*